(12) United States Patent
Kumazaki (10) Patent No.: US 12,258,035 B2
(45) Date of Patent: Mar. 25, 2025

(54) DEVICE, METHOD, AND COMPUTER PROGRAM FOR PROPOSING AUTONOMOUS DRIVING

(71) Applicant: TOYOTA JIDOSHA KABUSHIKI KAISHA, Toyota (JP)

(72) Inventor: Kenta Kumazaki, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 188 days.

(21) Appl. No.: 18/323,666

(22) Filed: May 25, 2023

(65) Prior Publication Data

US 2023/0406339 A1 Dec. 21, 2023

(30) Foreign Application Priority Data

Jun. 21, 2022 (JP) .................................. 2022-099780

(51) Int. Cl.
*B60W 50/14* (2020.01)
*B60W 60/00* (2020.01)

(52) U.S. Cl.
CPC ........ *B60W 50/14* (2013.01); *B60W 60/0051* (2020.02); *B60W 2540/215* (2020.02)

(58) Field of Classification Search
CPC .. B60W 50/14; B60W 60/0051; B60W 50/08; B60Q 9/00
USPC .......................................................... 701/23
See application file for complete search history.

(56) References Cited

U.S. PATENT DOCUMENTS

| | | | |
|---|---|---|---|
| 2015/0194055 A1* | 7/2015 | Maass | G08G 1/096716 340/905 |
| 2016/0313792 A1* | 10/2016 | Siegel | G02B 27/0172 |
| 2018/0046196 A1* | 2/2018 | Hashimoto | B60W 50/14 |
| 2020/0094838 A1 | 3/2020 | Nishimura et al. | |
| 2021/0053515 A1* | 2/2021 | Dombrovskis | B60H 1/00742 |
| 2021/0070308 A1* | 3/2021 | Kim | B60W 60/0053 |
| 2022/0066570 A1* | 3/2022 | Takabatake | G06F 3/0482 |

(Continued)

FOREIGN PATENT DOCUMENTS

| | | | |
|---|---|---|---|
| EP | 3115942 A1 * | 1/2017 | ......... B60W 30/182 |
| JP | 2018-065515 A | 4/2018 | |
| JP | 2020-052658 A | 4/2020 | |

*Primary Examiner* — Tuan C To
(74) *Attorney, Agent, or Firm* — Sughrue Mion, PLLC (57) ABSTRACT

A device for proposing autonomous driving includes a processor configured to identify an autonomously travelable section in which a vehicle is capable of traveling under autonomous driving control, make a proposal for travel under autonomous driving control to a driver of the vehicle via a notification device when a proposal determination value corresponding to the length of the identified autonomously travelable section satisfies a first proposal criterion, stop proposing travel through the autonomously travelable section under autonomous driving control to the driver when the proposal determination value corresponding to the length of the identified autonomously travelable section does not satisfy the first proposal criterion, and add a predetermined addition value to the proposal determination value corresponding to the length of the identified autonomously travelable section when an action of the driver to consent to the proposal for travel under autonomous driving control to the driver is not detected.

5 Claims, 7 Drawing Sheets

(56) References Cited

U.S. PATENT DOCUMENTS

2022/0244683 A1* 8/2022 Wushour ............... G06N 5/043
2022/0340166 A1* 10/2022 Kume ............. B60W 30/18163

* cited by examiner

(INITIAL SETTING)

| LENGTH OF AUTONOMOUSLY TRAVELABLE SECTION L | PROPOSAL DETERMINATION VALUE | |
|---|---|---|
| 0m~200m | 0 | (PROPOSAL EXECUTED) |
| 200m~400m | 0 | (PROPOSAL EXECUTED) |
| 400m~600m | 0 | (PROPOSAL EXECUTED) |
| 600m~800m | 0 | (PROPOSAL EXECUTED) |
| 800m~1000m | 0 | (PROPOSAL EXECUTED) |
| 1000m~ | 0 | (PROPOSAL EXECUTED) |

600

(AT TIME t1)

| LENGTH OF AUTONOMOUSLY TRAVELABLE SECTION L | PROPOSAL DETERMINATION VALUE | |
|---|---|---|
| 0m~200m | 0.8 | (PROPOSAL STOPPED) |
| 200m~400m | 0.8 | (PROPOSAL STOPPED) |
| 400m~600m | 0.2 | (PROPOSAL EXECUTED) |
| 600m~800m | 0.1 | (PROPOSAL EXECUTED) |
| 800m~1000m | 0.1 | (PROPOSAL EXECUTED) |
| 1000m~ | 0 | (PROPOSAL EXECUTED) |

610

DEVICE, METHOD, AND COMPUTER PROGRAM FOR PROPOSING AUTONOMOUS DRIVING

FIELD

The present invention relates to a device, a method, and a computer program for proposing application of autonomous driving control, to a driver, in a vehicle to which autonomous driving control is applicable.

BACKGROUND

A technique to appropriately switch driving control of a vehicle to which autonomous driving control is applicable when a predetermined condition is satisfied has been proposed (see Japanese Unexamined Patent Publication JP2018-65515A).

A driving switching device described in JP2018-65515A executes control so as not to switch between autonomous driving mode and manual driving mode when a predicted time for passing through an autonomous driving recommended section or a manual driving recommended section is less than the time obtained by adding a margin to double of a driving mode switching time. In this way, the driving switching device reduces a driver's burden caused by frequent switching.

SUMMARY

Whether a driver wishes autonomous driving control to be applied depends on the driver's preferences. A proposal by a vehicle controller to apply autonomous driving control to a driver who does not wish autonomous driving control to be applied may annoy the driver. It is therefore preferable to appropriately determine whether to propose application of autonomous driving control, depending on a driver's preferences, even when his/her vehicle travels on a section in which autonomous driving control can be executed.

It is an object of the present invention to provide a device for proposing autonomous driving that can determine whether to propose application of autonomous driving control to a driver appropriately.

According to an embodiment, a device for proposing autonomous driving is provided. The device includes a processor configured to: identify an autonomously travelable section in which a vehicle is capable of traveling under autonomous driving control, ahead on a path of the vehicle, make a proposal for travel under autonomous driving control to a driver of the vehicle via a notification device when a proposal determination value corresponding to the length of the identified autonomously travelable section among proposal determination values set for lengths of the autonomously travelable section satisfies a first proposal criterion, stop proposing travel through the autonomously travelable section under autonomous driving control to the driver when the proposal determination value corresponding to the length of the identified autonomously travelable section does not satisfy the first proposal criterion, and add a predetermined addition value to the proposal determination value corresponding to the length of the identified autonomously travelable section when an action of the driver to consent to the proposal for travel under autonomous driving control to the driver is not detected.

The processor of the device is preferably further configured to subtract, every time the proposal for travel through the identified autonomously travelable section under autonomous driving control is stopped, a predetermined subtraction value from the proposal determination value corresponding to the length of the identified autonomously travelable section. After the proposal determination value corresponding to the length of the identified autonomously travelable section starts to fail to satisfy the first proposal criterion, the processor preferably stops proposing travel through the identified autonomously travelable section under autonomous driving control to the driver when the proposal determination value does not satisfy a second proposal criterion that is stricter than the first proposal criterion, and the processor preferably proposes travel through the identified autonomously travelable section under autonomous driving control to the driver via the notification device when the proposal determination value corresponding to the length of the identified autonomously travelable section satisfies the second proposal criterion.

The processor is preferably further configured to execute autonomous driving control of the vehicle upon detection of an action of the driver to consent to the proposal.

According to another embodiment, a method for proposing autonomous driving is provided. The method includes identifying an autonomously travelable section in which a vehicle is capable of traveling under autonomous driving control, ahead on a path of the vehicle; making a proposal for travel under autonomous driving control to a driver of the vehicle via a notification device when a proposal determination value corresponding to the length of the identified autonomously travelable section among proposal determination values set for lengths of the autonomously travelable section satisfies a first proposal criterion; stopping proposing travel through the autonomously travelable section under autonomous driving control to the driver when the proposal determination value corresponding to the length of the identified autonomously travelable section does not satisfy the first proposal criterion; and adding a predetermined addition value to the proposal determination value corresponding to the length of the identified autonomously travelable section when an action of the driver to consent to the proposal for travel under autonomous driving control to the driver is not detected.

According to still another embodiment, a non-transitory recording medium that stores a computer program for proposing autonomous driving is provided. The computer program causing a processor mounted on a vehicle to execute a process including identifying an autonomously travelable section in which the vehicle is capable of traveling under autonomous driving control, ahead on a path of the vehicle; making a proposal for travel under autonomous driving control to a driver of the vehicle via a notification device when a proposal determination value corresponding to the length of the identified autonomously travelable section among proposal determination values set for lengths of the autonomously travelable section satisfies a first proposal criterion; stopping proposing travel through the autonomously travelable section under autonomous driving control to the driver when the proposal determination value corresponding to the length of the identified autonomously travelable section does not satisfy the first proposal criterion; and adding a predetermined addition value to the proposal determination value corresponding to the length of the identified autonomously travelable section when an action of the driver to consent to the proposal for travel under autonomous driving control to the driver is not detected.

The device for proposing autonomous driving according to the present disclosure has an advantageous effect of being able to determine whether to propose application of autonomous driving control to a driver appropriately.

DESCRIPTION OF EMBODIMENTS

A device for proposing autonomous driving, a method for proposing autonomous driving by the device, and a computer program for proposing autonomous driving will now be described with reference to the attached drawings. The device identifies a section in which a host vehicle is capable of traveling under autonomous driving control (hereafter an "autonomously travelable section") ahead on a path of the vehicle. When a proposal determination value corresponding to the length of the identified autonomously travelable section among proposal determination values set for lengths of the autonomously travelable section is not greater than a predetermined inhibition threshold, the device determines that a first proposal criterion related to an autonomous driving proposal is satisfied, and proposes travel under autonomous driving control to a driver of the vehicle. When the proposal determination value corresponding to the length of the identified autonomously travelable section is greater than the predetermined inhibition threshold, the device determines that the first proposal criterion is not satisfied, and stops proposing travel through the autonomously travelable section under autonomous driving control to the driver. In addition, when the driver's action to consent to the proposal for travel under autonomous driving control is not detected, the device adds a predetermined addition value to the proposal determination value corresponding to the length of the identified autonomously travelable section. In this way, the device adjusts the proposal determination value, which is an index for determining whether to propose autonomous driving, for each length of autonomously travelable section, depending on the driver's reaction to the proposal for autonomous driving. Thus the device can determine whether to propose application of autonomous driving control to the driver appropriately, depending on the length of the autonomously travelable section.

In the present embodiment, the level of autonomous driving control applied to the vehicle is a level of driving control at which the driver's operation of an accelerator, a brake, and steering is not required. More specifically, the level of autonomous driving control may be a level at which the driver is required to watch around the vehicle or to hold a steering wheel or a level at which the driver is not required to do so. For example, the level of autonomous driving control applied to the vehicle may be level 2 or 3 of autonomous driving control defined by the Society of Automotive Engineers (SAE).

Figure 1:
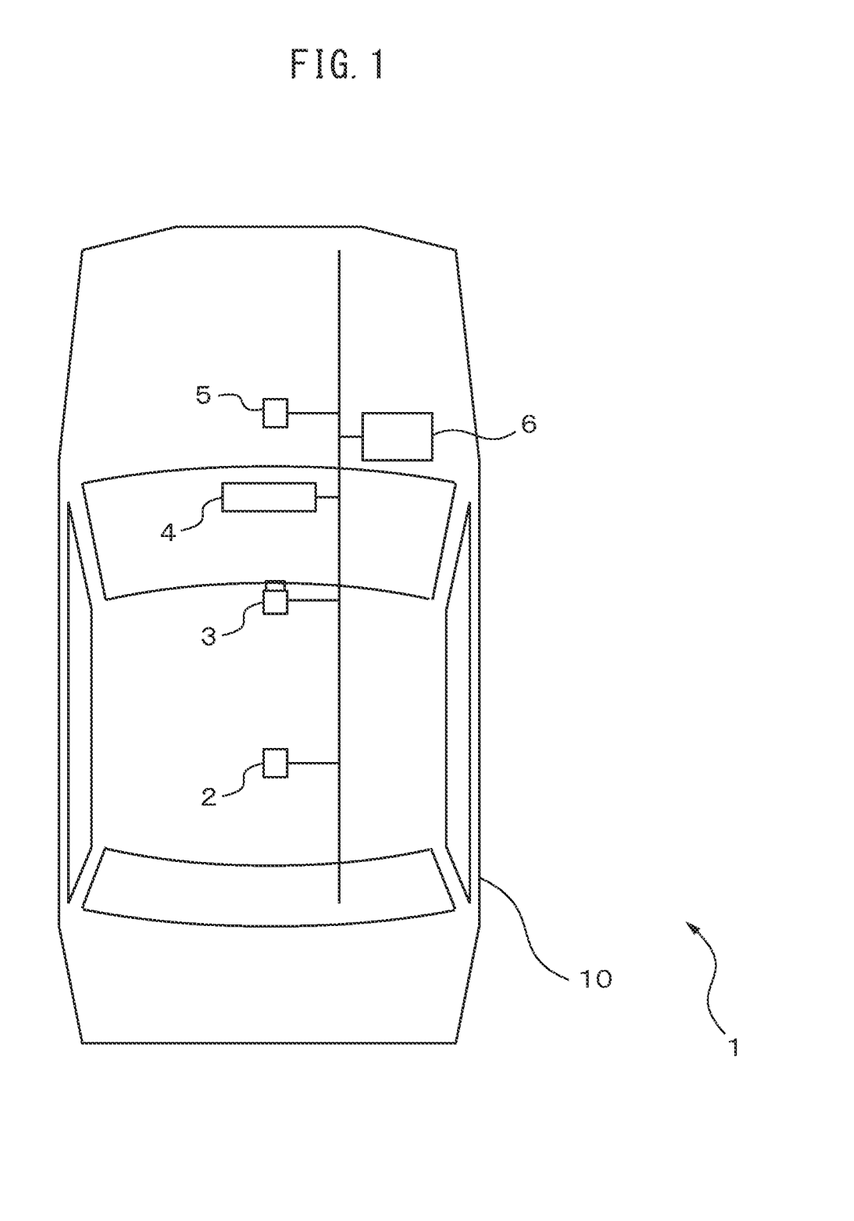
FIG. 1 schematically illustrates the configuration of a vehicle control system equipped with a device for proposing autonomous driving.
Figure 2:
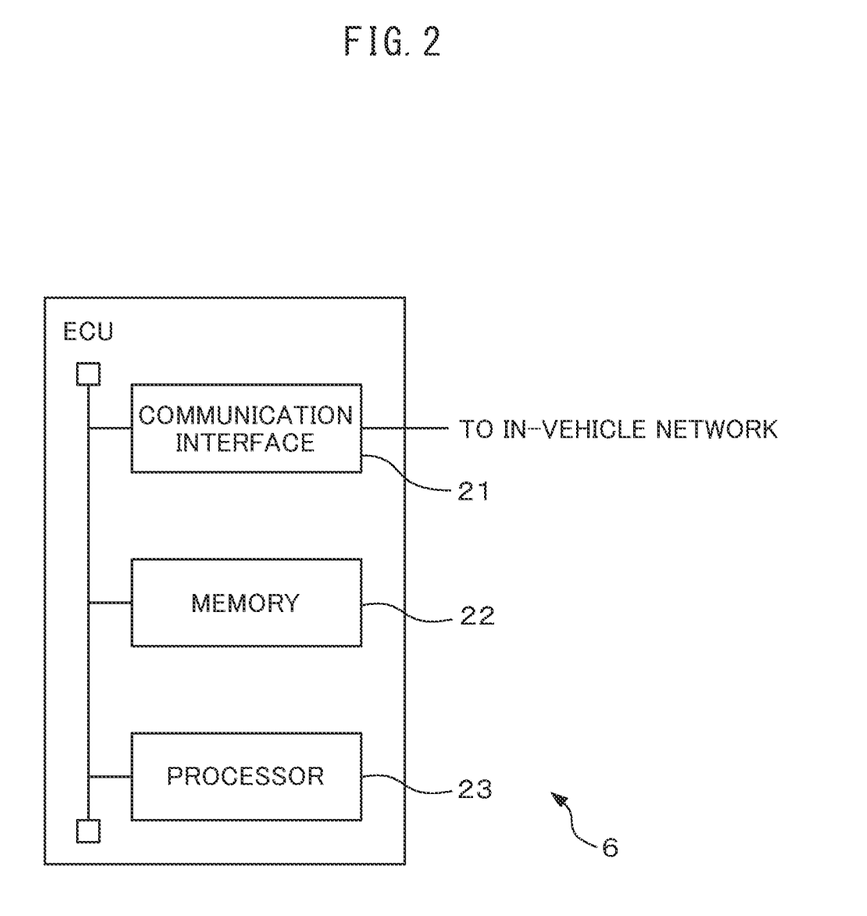
FIG. 2 illustrates the hardware configuration of an electronic control unit, which is an embodiment of the device for proposing autonomous driving.

FIG. 1 schematically illustrates the configuration of a vehicle control system equipped with the device for proposing autonomous driving. FIG. 2 illustrates the hardware configuration of an electronic control unit, which is an embodiment of the device for proposing autonomous driving. The vehicle control system 1 is mounted on a vehicle 10, and controls the vehicle 10. To achieve this, the vehicle control system 1 includes a GPS receiver 2, a camera 3, a user interface 4, a storage device 5, and an electronic control unit (ECU) 6, which is an example of the device for proposing autonomous driving. The GPS receiver 2, the camera 3, the user interface 4, and the storage device 5 are communicably connected to the ECU 6 via an in-vehicle network conforming to a standard such as a controller area network. The vehicle control system 1 may further include a navigation device (not illustrated) that searches for a planned travel route to a destination, a wireless communication terminal (not illustrated) for wireless communication with another device, or a distance sensor (not illustrated), such as a LiDAR sensor or radar.

The GPS receiver 2, which is an example of a position determining device, receives GPS signals from GPS satellites at predetermined intervals, and determines the position of the vehicle 10, based on the received GPS signals. The GPS receiver 2 outputs positioning information indicating the result of determination of the position of the vehicle 10 based on the GPS signals to the ECU 6 via the in-vehicle network at predetermined intervals. Instead of the GPS receiver 2, the vehicle 10 may include a receiver conforming to another satellite positioning system. In this case, the receiver determines the position of the vehicle 10.

The camera 3 is an example of a sensor that can detect objects around the vehicle 10. The camera 3 includes a two-dimensional detector constructed from an array of optoelectronic transducers, such as CCD or C-MOS, having sensitivity to visible light and a focusing optical system that forms an image of a target region on the two-dimensional detector. The camera 3 is mounted, for example, in the interior of the vehicle 10 so as to be oriented, for example, to the front of the vehicle 10. The camera 3 takes a picture of a region in front of the vehicle 10 every predetermined capturing period, and generates an image representing the region. Each image obtained by the camera 3 is an example of a sensor signal, and may be a color or grayscale image. The vehicle 10 may include two or more cameras taking pictures in different orientations or having different focal lengths.

Every time an image is generated, the camera 3 outputs the generated image to the ECU 6 via the in-vehicle network.

The user interface 4, which is an example of the notification unit, includes, for example, a display, such as a liquid crystal display, or a touch screen display. The user interface 4 is mounted in the interior of the vehicle 10, e.g., near an instrument panel, so as to face the driver. The user interface 4 displays predetermined information received from the ECU 6 via the in-vehicle network, in the form of an icon or text, to notify the driver of the information. The user interface 4 may include one or more light sources provided on the instrument panel, a speaker mounted in the vehicle interior, or a vibrator provided in the steering or the driver's seat. In this case, the user interface 4 outputs predetermined information received from the ECU 6 via the in-vehicle network, in the form of a voice signal, to notify the driver of the information. Alternatively, the user interface 4 may vibrate the vibrator according to a signal received from the ECU 6 via the in-vehicle network to notify the driver of predetermined information with the vibration. Alternatively, the user interface 4 may light up or blink the light sources according to a signal received from the ECU 6 via the in-vehicle network to notify the driver of predetermined information.

In addition, a predetermined operation is performed on the user interface 4 by the driver. For example, when the user interface 4 includes a touch screen, a signal indicating a region in the touch screen touched by the driver is outputted to the ECU 6. The user interface 4 may include one or more switches on which the predetermined operation is performed. In this case, when one of the one or more switches is operated, the user interface 4 outputs a signal indicating the operated switch and the state after the operation of the switch to the ECU 6. The user interface 4 may further include a microphone. In this case, the user interface 4 outputs a voice signal representing the driver's voice collected via the microphone to the ECU 6.

The storage device 5, which is an example of a storage unit, includes, for example, a hard disk drive, a nonvolatile semiconductor memory, or an optical medium and an access device therefor. The storage device 5 stores a high-precision map, which an example of map information. The high-precision map includes information indicating a region in which autonomous driving control is applicable (hereafter an "autonomously travelable region") and information used for autonomous driving control on individual road sections in the autonomously travelable region. The information used for autonomous driving control includes, for example, information indicating road markings, such as lane-dividing lines or stop lines, signposts, and features around roads of each road section within an autonomously travelable region represented in the high-precision map.

The storage device 5 may further include a processor for executing, for example, a process to update the high-precision map and a process related to a request from the ECU 6 to read out the high-precision map. For example, every time the vehicle 10 moves a predetermined distance, the storage device 5 may transmit a request to obtain a high-precision map, together with the current position of the vehicle 10, to a map server via a wireless communication terminal (not illustrated). The storage device 5 receives a high-precision map of a predetermined region around the current position of the vehicle 10 from the map server via the wireless communication terminal. Upon receiving a request from the ECU 6 to read out the high-precision map, the storage device 5 cuts out that portion of the high-precision map stored therein which includes the current position of the vehicle 10 and which represents a region smaller than the predetermined region, and outputs the cut portion to the ECU 6 via the in-vehicle network.

The ECU 6 determines whether to propose application of autonomous driving control to the driver of the vehicle 10 when autonomous driving control is applicable to the vehicle 10. Further, when an action to consent to a proposal to apply autonomous driving control is performed by the driver, the ECU 6 executes autonomous driving control of the vehicle 10. When an action to consent to a proposal to apply autonomous driving control is not performed by the driver, the ECU 6 adjusts a proposal determination value, which is an index for determining whether to make the proposal.

As illustrated in FIG. 2, the ECU 6 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 6 to the in-vehicle network. Every time positioning information is received from the GPS receiver 2, the communication interface 21 passes the received positioning information to the processor 23. Every time an image is received from the camera 3, the communication interface 21 passes the received image to the processor 23. In addition, the communication interface 21 passes the high-precision map read from the storage device 5 to the processor 23. Further, the communication interface 21 outputs information or a signal addressed to the user interface 4 received from the processor 23 to the user interface 4 via the in-vehicle network. Further, every time a signal indicating the driver's predetermined operation is received from the user interface 4, the communication interface 21 passes the signal to the processor 23.

The memory 22, which is another example of a storage unit, includes, for example, volatile and nonvolatile semiconductor memories. The memory 22 stores various types of data used in an autonomous driving proposal process executed by the processor 23 of the ECU 6. For example, the memory 22 stores an inhibition threshold, a reproposal threshold, a proposal determination value for each length of autonomously travelable section, and a state flag indicating the state of the proposal for each length of autonomously travelable section. The memory 22 further stores a high-precision map read from the storage device 5. In addition, the memory 22 temporarily stores images received from the camera 3, positioning information received from the GPS receiver 2, and various types of data generated during the autonomous driving proposal process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes a vehicle control process including the autonomous driving proposal process on the vehicle 10.

Figure 3:
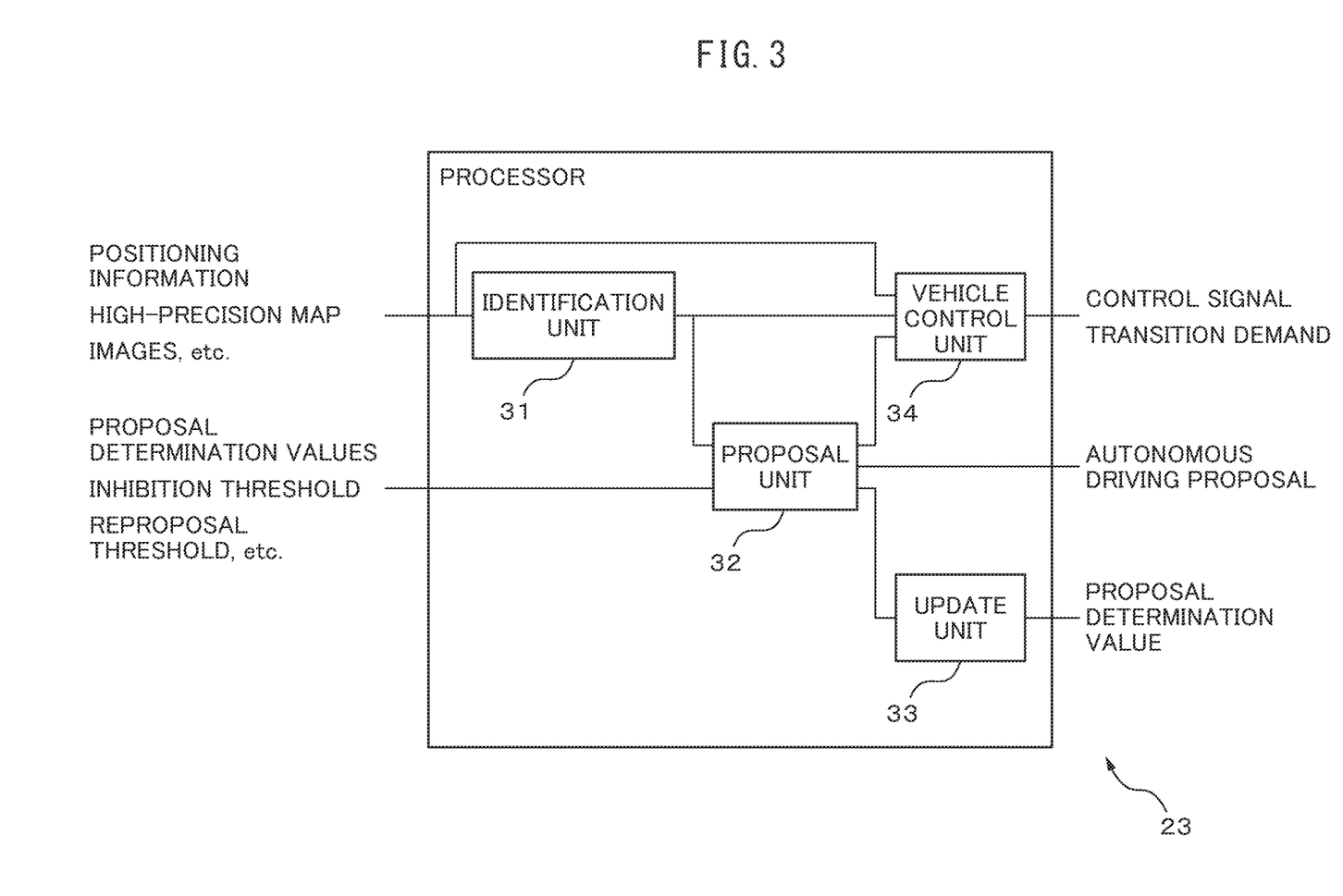
FIG. 3 is a functional block diagram of a processor of the electronic control unit, related to an autonomous driving proposal process.

FIG. 3 is a functional block diagram of the processor 23, related to the autonomous driving proposal process. The processor 23 includes an identification unit 31, a proposal unit 32, an update unit 33, and a vehicle control unit 34. These units included in the processor 23 are functional modules, for example, implemented by a computer program executed by the processor 23, or may be dedicated operating circuits provided in the processor 23.

The identification unit 31 identifies an autonomously travelable section in which the vehicle 10 is capable of traveling under autonomous driving control, ahead on a path of the vehicle 10, while the vehicle 10 is under the driver's manual driving control. To achieve this, the identification unit 31 identifies a road being traveled by the vehicle 10 by referring to the current position of the vehicle 10 indicated by the latest positioning information and the high-precision map. The identification unit 31 then identifies that road section of the identified road in the travel direction of the vehicle 10 measured by a direction sensor (not illustrated) mounted on the vehicle 10 which is included in an autonomously travelable region represented in the high-precision map, as an autonomously travelable section. Further, the identification unit 31 determines the length of the road section included in the autonomously travelable region as the length of the autonomously travelable section.

The identification unit 31 notifies the proposal unit 32 of both endpoints of the identified autonomously travelable section, i.e., the start point on the nearer side and the end point on the farther side in the travel direction of the vehicle 10, as well as the length of the section.

The proposal unit 32 determines whether to propose autonomous driving, based on a proposal determination value corresponding to the length of the identified autonomously travelable section, when a proposal determining condition is satisfied regarding the autonomously travelable section. For example, when the vehicle 10 enters the identified autonomously travelable section, the proposal unit 32 determines that the proposal determining condition is satisfied, and reads the proposal determination value and the state flag corresponding to the length of the autonomously travelable section from the memory 22. When the value of the state flag indicates that proposing is allowed, the proposal unit 32 compares the proposal determination value with the inhibition threshold. When the proposal determination value is not greater than the inhibition threshold, the proposal unit 32 determines that a first proposal criterion is satisfied, and proposes travel of the vehicle 10 under autonomous driving control to the driver via the user interface 4. When the read proposal determination value is greater than the inhibition threshold, the proposal unit 32 determines that the first proposal criterion is not satisfied, and stops proposing travel of the vehicle 10 under autonomous driving control. The proposal unit 32 further rewrites the value of the state flag to a value indicating that proposing is stopped. In the following, proposing travel of the vehicle 10 under autonomous driving control will be referred to as "proposing autonomous driving" or an "autonomous driving proposal."

To determine whether the vehicle 10 has entered an autonomously travelable section, the proposal unit 32 refers to the current position of the vehicle 10 indicated by the latest positioning information and areas of autonomously travelable sections represented in the high-precision map. When the current position of the vehicle 10 is within an autonomously travelable section, the proposal unit 32 determines that the vehicle 10 has entered an autonomously travelable section.

The proposal unit 32 may determine that the proposal determining condition is satisfied, when the distance from the current position of the vehicle 10 to the identified autonomously travelable section falls below a predetermined distance. In this case, the proposal unit 32 determines the distance to the start point of the identified autonomously travelable section by referring to the current position of the vehicle 10 indicated by the latest positioning information.

When proposing autonomous driving, the proposal unit 32 causes the display or the touch screen included in the user interface 4 to display a message such as "Would you like to start autonomous driving?" or an icon indicating that autonomous driving control is applicable. In this way, the proposal unit 32 notifies the driver of an autonomous driving proposal. Alternatively, the proposal unit 32 may cause the speaker included in the user interface 4 to output a voice signal representing such a message. Alternatively, the proposal unit 32 may cause the one or more light sources included in the user interface 4 to light up or blink in a mode indicating that autonomous driving control is applicable. Alternatively, the proposal unit 32 may vibrate the vibrator included in the user interface 4 in a mode indicating that autonomous driving control is applicable. The proposal unit 32 may notify the driver of an autonomous driving proposal by two or more of the operations of the user interface 4 described above.

After proposing autonomous driving to the driver, the proposal unit 32 determines whether the driver has performed an action to consent to the autonomous driving proposal. In the following, the driver's action to consent to an autonomous driving proposal will be referred to simply as a "consent action." For example, when the ECU 6 receives a signal indicating a touch of the region corresponding to an autonomous driving proposal from the touch screen of the user interface 4, the proposal unit 32 determines that the driver has performed a consent action. Alternatively, when the ECU 6 receives a signal indicating that a switch corresponding to an autonomous driving proposal among the one or more switches of the user interface 4 is operated to a predetermined switch position, the proposal unit 32 may determine that the driver has performed a consent action. Alternatively, the proposal unit 32 may execute a voice recognition process on a voice signal received by the ECU 6 from the microphone of the user interface 4 to determine whether a keyword meaning consent to the autonomous driving proposal (e.g., "Yes") is detected. When such a keyword is detected, the proposal unit 32 may determine that the driver has performed a consent action. As the voice recognition process, the proposal unit 32 can use, for example, a GMM-HMM-based voice recognition process using a Gaussian mixture model (GMM) and a hidden Markov model (HMM) or a DNN-HMM-based voice recognition process using a deep neural network (DNN) and a HMM.

Upon determining that the driver has performed a consent action, the proposal unit 32 notifies the vehicle control unit 34 that a consent action has been performed. In the case where a consent action is not detected even after a predetermined period from the autonomous driving proposal, the proposal unit 32 determines that the driver has not performed a consent action. In this case, the ECU 6 does not execute autonomous driving control of the vehicle 10 and continues the driver's manual driving control even when the vehicle 10 is traveling on an autonomously travelable section. Further, the proposal unit 32 notifies the update unit 33 of the length of the identified autonomously travelable section and the fact that the driver's consent action is not detected. The predetermined period may be, for example, a period having a preset length, or a period from an autonomous driving proposal until the vehicle 10 reaches a position a predetermined distance from the end point of the autonomously travelable section on which the vehicle 10 is traveling. In this case, the proposal unit 32 determines whether the vehicle 10 has reached the position a predetermined distance from the end point of the autonomously travelable section by referring to the position of the vehicle 10 indicated by the latest positioning information.

To a length of autonomously travelable section whose proposal determination value has exceeded the inhibition threshold, the proposal unit 32 applies a reproposal threshold, instead of the inhibition threshold, as the threshold for determining whether to propose autonomous driving. The reproposal threshold is set lower than the inhibition threshold. In other words, the proposal unit 32 does not propose autonomous driving unless the proposal determination value satisfies a second proposal criterion that is stricter than the first proposal criterion. Thus, for a length of autonomously travelable section whose state flag has a value indicating that proposing is stopped, the proposal unit 32 does not propose autonomous driving until the proposal determination value falls below the reproposal threshold even if the proposal determining condition is satisfied. In other words, while the proposal determination value is not less than the reproposal threshold, the proposal unit 32 determines that the second proposal criterion is not satisfied, and stops proposing autonomous driving. The proposal unit 32 notifies the update unit 33 of the length of the identified autonomously travelable section and the fact that proposing autonomous driving is stopped. When the proposal determination value of an autonomously travelable section having that length falls below the reproposal threshold, the proposal unit 32 determines that the second proposal criterion is satisfied, and proposes autonomous driving via the user interface 4.

In this case, the proposal unit 32 applies the inhibition threshold again to a length of autonomously travelable section whose proposal determination value falls below the reproposal threshold, instead of the reproposal threshold, as the threshold for determining whether to propose autonomous driving. In other words, the first proposal criterion is applied again, instead of the second proposal criterion. Thus the proposal unit 32 rewrites the value of the state flag to a value indicating that proposing is allowed. In this way, hysteresis of the threshold for determining whether to propose autonomous driving prevents frequent switching as to whether to propose autonomous driving. This enables the proposal unit 32 to prevent confusing the driver.

Whenever notified by the proposal unit 32 of the length of the identified autonomously travelable section and the fact that the driver's consent action is not detected, the update unit 33 adds a predetermined addition value (e.g., 0.1) to the proposal determination value corresponding to the length. Thus the proposal determination value corresponding to a certain length of autonomously travelable section increases with the number of times of omission of the driver's consent action regarding autonomously travelable sections having the length, and exceeds the inhibition threshold at a certain time. This results in an autonomous driving proposal being stopped for an autonomously travelable section having the length. Thus, for each length of autonomously travelable section, whether to propose autonomous driving is optimized depending on the driver's preferences.

The initial value of the proposal determination value is preferably set lower than the inhibition threshold. In the initial setting, autonomous driving will be proposed when the proposal determining condition is satisfied, regardless of the length of the identified autonomously travelable section.

Whenever notified by the proposal unit 32 of the length of the identified autonomously travelable section and the fact that proposing autonomous driving is stopped, the update unit 33 subtracts a predetermined subtraction value (e.g., 0.01) from the proposal determination value corresponding to the length. Thus, after a stop of an autonomous driving proposal for a certain length of autonomously travelable section, the proposal determination value gradually decreases. Thereafter, at a certain time, the proposal determination value falls below the reproposal threshold, and proposing autonomous driving is started again. This prevents a permanent stop of an autonomous driving proposal for a length of autonomously travelable section in which proposing autonomous driving is stopped. Thus, when the driver starts to wish autonomous driving control to be applied to a length of autonomously travelable section in which the driver did not wish autonomous driving control because of a change in the driver's preferences, autonomous driving control can be applied thereto. The absolute value of the predetermined subtraction value is preferably less than that of the predetermined addition value. This prevents an immediate restart of an autonomous driving proposal for a length of autonomously travelable section in which proposing autonomous driving is stopped, and thus prevents a stop of an autonomous driving proposal from being meaningless.

Figure 4:
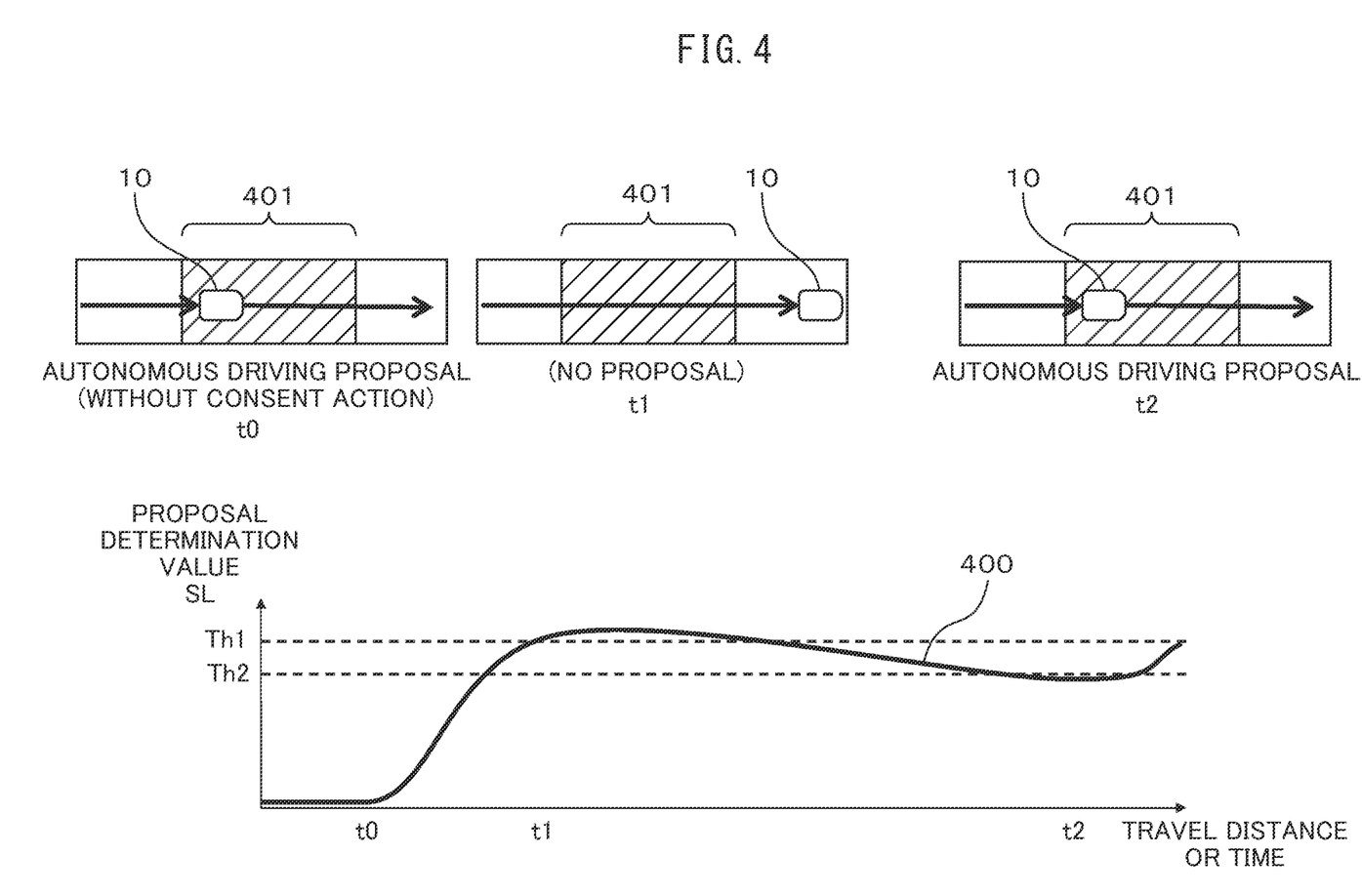
FIG. 4 illustrates an example of the relationship between changes in a proposal determination value and whether to propose autonomous driving.

FIG. 4 illustrates an example of the relationship between changes in a proposal determination value and whether to propose autonomous driving.

The upper side of FIG. 4 illustrates whether to propose autonomous driving at entry of the vehicle 10 into an autonomously travelable section of length L at times t0 to t2 in the order from the left. The lower side of FIG. 4 illustrates an example of changes in the proposal determination value corresponding to the autonomously travelable section of length L. More specifically, in the lower side of FIG. 4, the abscissa represents travel distance or time of the vehicle 10 whereas the ordinate represents the magnitude of the proposal determination value. The graph 400 represents an example of changes in the proposal determination value.

At time t0 before update of the proposal determination value, the proposal determination value SL has a smaller value than an inhibition threshold Th1. Hence, autonomous driving is proposed when the vehicle 10 enters an autonomously travelable section 401 of length L, as illustrated in the upper left of FIG. 4. The proposal determination value SL gradually increases because the driver's consent action is not detected every time the vehicle 10 enters an autonomously travelable section of length L. At time t1, the proposal determination value SL exceeds the inhibition threshold Th1. Hence, at time t1, autonomous driving is not proposed even if the vehicle 10 enters an autonomously travelable section 401 of length L, as illustrated in the center of the upper side of FIG. 4. Thereafter, the proposal determination value SL gradually decreases because proposing autonomous driving is stopped every time the vehicle 10 enters an autonomously travelable section of length L. At time t2, the proposal determination value SL falls below a reproposal threshold Th2. Hence, at time t2, when the vehicle 10 enters an autonomously travelable section 401 of length L, proposing autonomous driving is started again, as illustrated in the upper right of FIG. 4.

Figure 5:
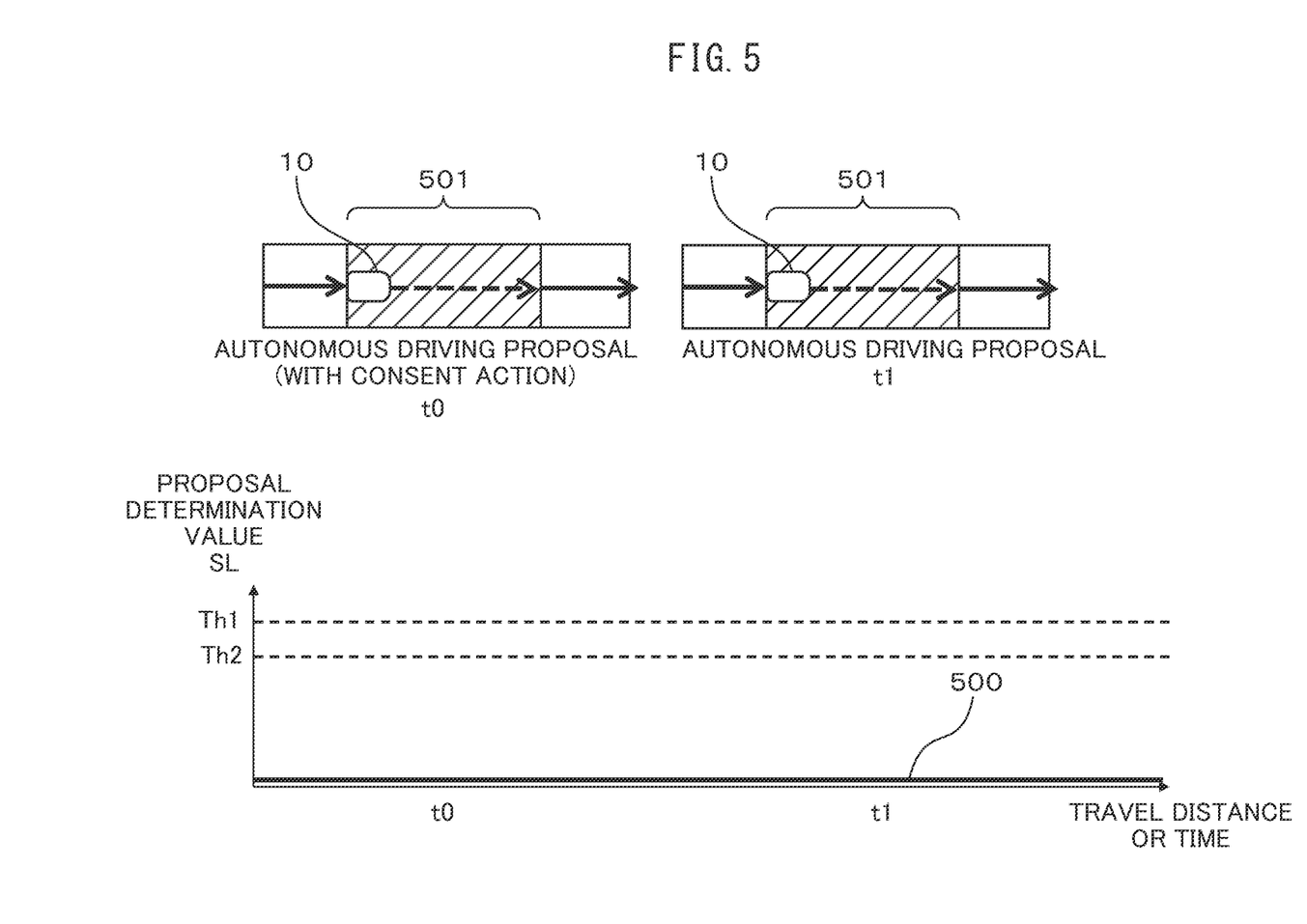
FIG. 5 illustrates another example of the relationship between changes in a proposal determination value and whether to propose autonomous driving.

FIG. 5 illustrates another example of the relationship between changes in a proposal determination value and whether to propose autonomous driving.

The upper side of FIG. 5 illustrates whether to propose autonomous driving at entry of the vehicle 10 into an autonomously travelable section of length L at times t0 and t1 in the order from the left. The lower side of FIG. 5 illustrates an example of changes in the proposal determination value corresponding to the autonomously travelable section of length L. More specifically, in the lower side of FIG. 5, the abscissa represents travel distance or time of the vehicle 10 whereas the ordinate represents the magnitude of the proposal determination value. The graph 500 represents an example of changes in the proposal determination value.

At time t0 before update of the proposal determination value, the proposal determination value SL has a smaller value than an inhibition threshold Th1. Hence, in this example also, autonomous driving is proposed when the vehicle 10 enters an autonomously travelable section 501 of length L, as illustrated in the upper left of FIG. 5. In this example, every time the vehicle 10 enters an autonomously travelable section of length L, the driver performs a consent action and autonomous driving control is applied to the vehicle 10. For this reason, the proposal determination value SL is kept constant without increasing, and is thus below the inhibition threshold Th1 at time t1 also. Hence, at time t1 also, autonomous driving is proposed when the vehicle 10 enters an autonomously travelable section 501 of length L, as illustrated in the upper right of FIG. 5.

Figure 6:
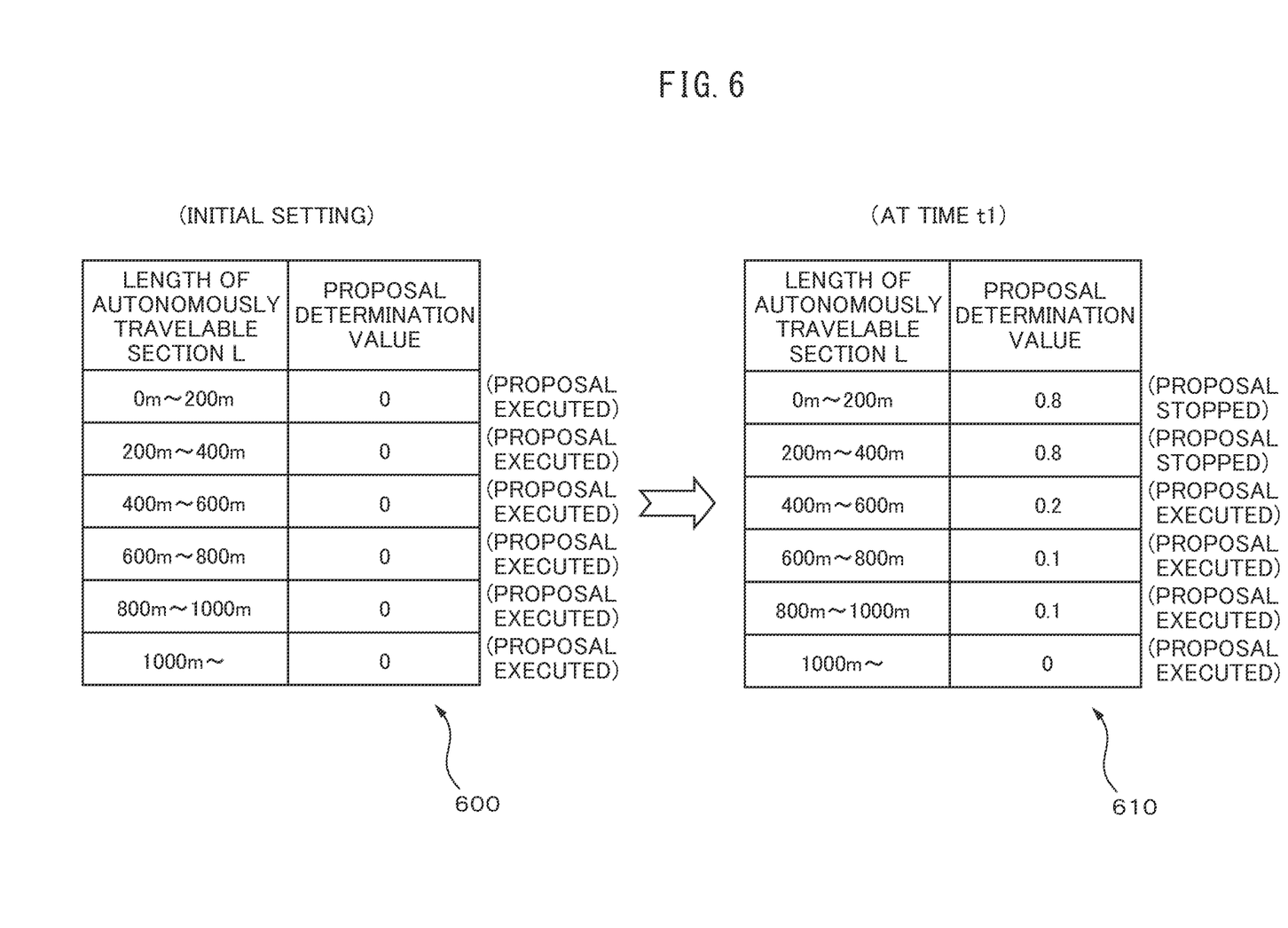
FIG. 6 illustrates an example of a proposal determination value for each length of autonomously travelable section.

FIG. 6 illustrates an example of the proposal determination value for each length of autonomously travelable section. In this example, a proposal determination value is set for each of the following divisions of length: 200 m or less, 200 to 400 m, 400 to 600 m, 600 to 800 m, 800 to 1000 m, and 1000 m or greater. In this example, assume that the inhibition threshold Th1 is set at 0.75. In the initial setting, the proposal determination values SL of the respective divisions are set at 0, as illustrated in a table 600. Hence, autonomous driving is proposed for any length of autonomously travelable section. Thereafter, at time t1, the proposal determination values SL of the divisions of 200 m or less and 200 to 400 m are 0.8, which is greater than the inhibition threshold Th1, as illustrated in a table 610. Hence, autonomous driving is not proposed when the vehicle 10 enters an autonomously travelable section having a length of 200 m or less or 200 to 400 m. In contrast, the proposal determination values SL of the divisions of length of 400 m or greater are less than the inhibition threshold Th1. Hence, autonomous driving is proposed for an autonomously travelable section having a length of 400 m or greater.

In this way, whether to propose autonomous driving is appropriately adjusted for each length of autonomously travelable section, depending on the driver's preferences. Thus, for example, an autonomous driving proposal to a driver who wishes less for application of autonomous driving control to a shorter autonomously travelable section is inhibited when autonomously travelable sections and sections in which autonomous driving control is not applied are alternated in a relatively short distance. This makes the driver feel less annoyed.

The vehicle control unit 34 executes autonomous driving control of the vehicle 10 when notified by the proposal unit 32 that a consent action has been performed. The vehicle control unit 34 controls components of the vehicle 10, for example, so that the vehicle 10 keeps traveling along a lane on which the vehicle 10 is traveling (hereafter a "host vehicle lane"). To achieve this, the vehicle control unit 34 inputs each of time-series images generated by the camera 3 into a classifier to detect detection targets including lane-dividing lines and traveling vehicles around the vehicle 10. The vehicle control unit 34 then identifies a region sandwiched between the closest lane-dividing lines on the left and right of the vehicle 10 as the host vehicle lane. As such a classifier, the vehicle control unit 34 can use a DNN having architecture of a convolutional neural network type. Alternatively, as such a classifier, the vehicle control unit 34 may use a DNN having architecture of a self-attention network type. The classifier is trained in advance in accordance with a predetermined training technique, such as backpropagation, with a large number of training images representing detection targets.

The vehicle control unit 34 controls the steering so that the vehicle 10 travels along the center line of the detected host vehicle lane.

In addition, the vehicle control unit 34 controls components of the vehicle 10 so that the vehicle 10 will not collide with any of the traveling vehicles around the vehicle 10 detected by inputting time-series images into the classifier. For example, the vehicle control unit 34 identifies a vehicle within the region representing the host vehicle lane in each image as a leading vehicle ahead of the vehicle 10. The vehicle control unit 34 controls the accelerator and the brake of the vehicle 10 so as to keep the distance between the leading vehicle and the vehicle 10 not less than a predetermined distance. The bottom position of an object region representing a leading vehicle in an image is supposed to correspond to the position at which the leading vehicle is in contact with the road surface; and the positions of pixels in an image correspond one-to-one to directions viewed from the camera 3. Thus the vehicle control unit 34 can estimate the distance from the vehicle 10 to the leading vehicle, based on parameters of the camera 3, such as the height of the mounted position, the focal length, and the orientation of the camera 3, as well as the bottom position of the object region in each image. When the vehicle 10 is equipped with a distance sensor (not illustrated), the vehicle control unit 34 may use the distance to an object ahead of the vehicle 10 measured by the distance sensor as the distance from the vehicle 10 to the leading vehicle.

When no leading vehicle exists or the distance from the vehicle 10 to the leading vehicle is not less than the predetermined distance, the vehicle control unit 34 controls the accelerator and the brake so that the vehicle 10 travels at a predetermined target speed. The target speed may be, for example, the regulation speed or the legally permitted speed set for a road being traveled by the vehicle 10. In this case, the vehicle control unit 34 identifies the regulation speed or the legally permitted speed set for a road being traveled by the vehicle 10 as the target speed by referring to the current position of the vehicle 10 and the high-precision map. Alternatively, the target speed may be set by the driver via a switch of the user interface 4.

When the speed of the leading vehicle is less than a predetermined speed and no other vehicles traveling on a lane adjoining the host vehicle lane are detected, the vehicle control unit 34 may control the steering of the vehicle 10 so as to make a lane change to the adjoining lane.

When the distance from the current position of the vehicle 10 to the end point of the autonomously travelable section falls below a predetermined distance, the vehicle control unit 34 makes notification of switching to manual driving control, i.e., a transition demand to the driver, via the user interface 4. To this end, the vehicle control unit 34 causes the display or the touch screen included in the user interface 4 to display a message or an icon indicating a transition demand to the driver or a light source corresponding to the message to light up or blink. Alternatively, the vehicle control unit 34 causes the speaker included in the user interface 4 to output a voice signal representing the message. Alternatively, the vehicle control unit 34 vibrates the vibrator included in the user interface 4 in a mode corresponding to the message. When the user interface 4 includes two or more of the above-described devices, the vehicle control unit 34 may notify the driver of the message of a transition demand via each or one of the two or more devices. When the vehicle 10 exits from the autonomously travelable section, the vehicle control unit 34 finishes autonomous driving control and transfers control of the vehicle 10 to the driver.

Figure 7:
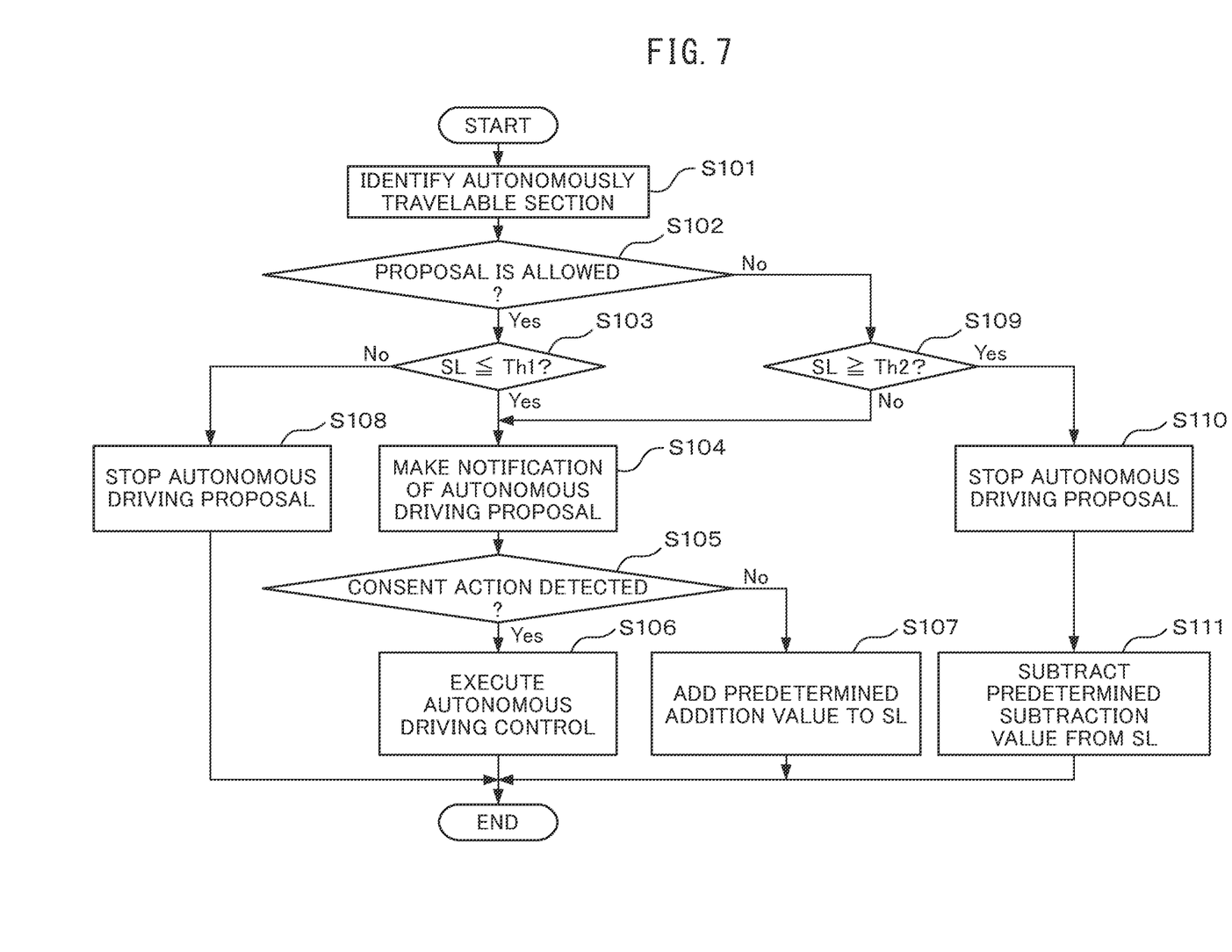
FIG. 7 is an operation flowchart of the autonomous driving proposal process.

FIG. 7 is an operation flowchart of the autonomous driving proposal process executed by the processor 23. The processor 23 executes a vehicle control process in accordance with the operation flowchart described below.

The identification unit 31 of the processor 23 identifies an autonomously travelable section ahead on a path of the vehicle 10 while the vehicle 10 is under the driver's manual driving control (step S101).

The proposal unit 32 of the processor 23 determines whether proposing autonomous driving is allowed regarding the length of the identified autonomously travelable section (step S102). In the case where proposing is allowed (Yes in step S102), the proposal unit 32 determines whether the proposal determination value SL corresponding to the length of the identified autonomously travelable section is not greater than the inhibition threshold Th1, when a proposal determining condition is satisfied (step S103). When the proposal determination value SL is not greater than the inhibition threshold Th1 (Yes in step S103), the proposal unit 32 notifies the driver of an autonomous driving proposal via the user interface 4 (step S104). Thereafter, the proposal unit 32 determines whether the driver's consent action is detected (step S105). When the driver's consent action is detected (Yes in step S105), the vehicle control unit 34 of the processor 23 executes autonomous driving control of the vehicle 10 while the vehicle 10 is traveling through the autonomously travelable section (step S106).

When the driver's consent action is not detected (No in step S105), the update unit 33 of the processor 23 adds a predetermined addition value to the proposal determination value SL corresponding to the length of the identified autonomously travelable section to update the proposal determination value SL (step S107). Further, the ECU 6 continues the driver's manual driving control.

When the proposal determination value SL is greater than the inhibition threshold Th1 in step S103 (No in step S103), the proposal unit 32 stops proposing autonomous driving and the ECU 6 continues the driver's manual driving control (step S108). In other words, the proposal unit 32 does not propose autonomous driving even when the proposal determining condition is satisfied. Further, the proposal unit 32 rewrites the value of the state flag of the autonomous driving proposal corresponding to the length of the identified autonomously travelable section to a value indicating that proposing is stopped.

In the case where proposing autonomous driving is stopped regarding the length of the identified autonomously travelable section in step S102 (No in step S102), the proposal unit 32 determines whether the proposal determining condition is satisfied. When the proposal determining condition is satisfied, the proposal unit 32 determines whether the proposal determination value SL corresponding to the length of the identified autonomously travelable section is not less than the reproposal threshold Th2 (step S109). When the proposal determination value SL is not less than the reproposal threshold Th2 (Yes in step S109), the proposal unit 32 stops proposing autonomous driving and the ECU 6 continues the driver's manual driving control (step S110). The update unit 33 then subtracts a predetermined subtraction value from the proposal determination value SL corresponding to the length of the identified autonomously travelable section to update the proposal determination value SL (step S111).

When the proposal determination value SL is less than the reproposal threshold Th2 (No in step S109), the proposal unit 32 rewrites the value of the state flag of the autonomous driving proposal corresponding to the length of the identified autonomously travelable section to a value indicating that proposing is allowed. The processor 23 further executes the processing of step S104 and the subsequent steps.

After step S106, S107, S108, or S111, the processor 23 terminates the vehicle control process.

As has been described above, the device for proposing autonomous driving identifies an autonomously travelable section in which a host vehicle is capable of traveling under autonomous driving control, ahead on a path of the vehicle. When a proposal determination value corresponding to the length of the identified autonomously travelable section is not greater than a predetermined inhibition threshold, the device proposes travel under autonomous driving control to a driver of the vehicle. When the proposal determination value is greater than the predetermined inhibition threshold, the device stops proposing travel through the autonomously travelable section under autonomous driving control to the driver. In addition, when the driver's action to consent to the proposal is not detected, the device adds a predetermined addition value to the proposal determination value corresponding to the length of the identified autonomously travelable section. In this way, the device adjusts the proposal determination value for determining whether to propose autonomous driving for each length of autonomously travelable section, depending on the driver's reaction to the proposal for autonomous driving. Thus the device can determine whether to propose application of autonomous driving control to the driver appropriately, depending on the length of the autonomously travelable section.

According to a modified example, the proposal determining condition may include conditions other than the position of the vehicle 10. For example, the proposal determining condition may include at least one of the following conditions:
  the position of the vehicle 10 can be identified,
  lane-dividing lines can be detected,
  the shifter of the vehicle 10 is at a drive position,
  the driver is holding the steering wheel of the vehicle 10,
  the driver is wearing a seatbelt, and
  the doors of the vehicle 10 are properly closed.

Of these conditions, as for identification of the position of the vehicle 10, the proposal unit 32 determines that the position of the vehicle 10 can be identified, when the GPS receiver 2 has been able to receive GPS signals. As for detection of lane-dividing lines, the proposal unit 32 determines that lane-dividing lines can be detected, when the lane-dividing lines demarcating a host vehicle lane are detected by inputting an image obtained by the camera 3 into a classifier, as described in relation to the vehicle control unit 34. As for the shifter position, holding the steering wheel, wearing a seatbelt, and closing the doors, the proposal unit 32 determines whether these conditions are satisfied on the basis of sensor signals from sensors provided for the respective components. For example, when a signal indicating that the driver is touching the steering wheel is received by the ECU 6 from a touch sensor (not illustrated) provided for the steering, the proposal unit 32 determines that the driver is holding the steering wheel.

When the proposal determining condition includes one of the above-described conditions, the proposal unit 32 may reset the length from the current position of the vehicle 10 at the time when the proposal determining condition is satisfied to the end point of the identified autonomously travelable section as the length of the autonomously travelable section. The proposal unit 32 and the update unit 33 may then execute the processing in the embodiment, based on the reset length of the autonomously travelable section.

According to another modified example, the addition value and the subtraction value used for updating a proposal determination value may be negative values. In this case, the proposal determination value decreases every time the driver repeats omission of an action to consent to an autonomous driving proposal. Thus, in the case where the value of the state flag of the autonomous driving proposal indicates that proposing is allowed, the proposal unit 32 determines that a first proposal criterion is satisfied and proposes autonomous driving when the proposal determination value is not less than an inhibition threshold. When the proposal determination value is less than the inhibition threshold, the proposal unit 32 determines that the first proposal criterion is not satisfied, and stops proposing autonomous driving. Since the proposal determination value increases every time proposing autonomous driving is stopped, the reproposal threshold in this example is set greater than the inhibition threshold. In the case where the value of the state flag of the autonomous driving proposal indicates that proposing is stopped, the proposal unit 32 determines that a second proposal criterion that is stricter than the first proposal criterion is satisfied and proposes autonomous driving when the proposal determination value is greater than the reproposal threshold. When the proposal determination value is not greater than the reproposal threshold, the proposal unit 32 determines that the second proposal criterion is not satisfied, and stops proposing autonomous driving. In this modified example also, the device for proposing autonomous driving has the same advantageous effect as that of the embodiment.

The computer program for achieving the functions of the processor 23 of the ECU 6 according to the embodiment or modified examples may be provided in a form recorded on a computer-readable portable storage medium, such as a semiconductor memory, a magnetic medium, or an optical medium.

As described above, those skilled in the art may make various modifications according to embodiments within the scope of the present invention.

What is claimed is:

1. A device for proposing autonomous driving, comprising:
   a processor configured to:
      identify an autonomously travelable section in which a vehicle is capable of traveling under autonomous driving control, ahead on a path of the vehicle,
      make a proposal for travel under autonomous driving control to a driver of the vehicle via a notification device when a proposal determination value corresponding to the length of the identified autonomously travelable section among proposal determination values set for lengths of the autonomously travelable section satisfies a first proposal criterion,
      stop proposing travel through the autonomously travelable section under autonomous driving control to the driver when the proposal determination value corresponding to the length of the identified autonomously travelable section does not satisfy the first proposal criterion, and
      add a predetermined addition value to the proposal determination value corresponding to the length of the identified autonomously travelable section when an action of the driver to consent to the proposal is not detected.

2. The device according to claim 1, wherein the processor is further configured to subtract, every time the proposal for travel through the identified autonomously travelable section under autonomous driving control is stopped, a predetermined subtraction value from the proposal determination value corresponding to the length of the identified autonomously travelable section, and
   after the proposal determination value corresponding to the length of the identified autonomously travelable section starts to fail to satisfy the first proposal criterion, the processor stops proposing travel through the identified autonomously travelable section under autonomous driving control to the driver when the proposal determination value does not satisfy a second proposal criterion that is stricter than the first proposal criterion, and
   the processor proposes travel through the identified autonomously travelable section under autonomous driving control to the driver via the notification device when the proposal determination value corresponding to the length of the identified autonomously travelable section satisfies the second proposal criterion.

3. The device according to claim 1, wherein the processor is further configured to execute autonomous driving control of the vehicle upon detection of an action of the driver to consent to the proposal.

4. A method for proposing autonomous driving, comprising:
   identifying an autonomously travelable section in which a vehicle is capable of traveling under autonomous driving control, ahead on a path of the vehicle;
   making a proposal for travel under autonomous driving control to a driver of the vehicle via a notification device when a proposal determination value corresponding to the length of the identified autonomously travelable section among proposal determination values set for lengths of the autonomously travelable section satisfies a first proposal criterion;
   stopping proposing travel through the autonomously travelable section under autonomous driving control to the driver when the proposal determination value corresponding to the length of the identified autonomously travelable section does not satisfy the first proposal criterion; and
   adding a predetermined addition value to the proposal determination value corresponding to the length of the identified autonomously travelable section when an action of the driver to consent to the proposal is not detected.

5. A non-transitory recording medium that stores a computer program for proposing autonomous driving, the computer program causing a processor mounted on a vehicle to execute a process comprising:
   identifying an autonomously travelable section in which the vehicle is capable of traveling under autonomous driving control, ahead on a path of the vehicle;
   making a proposal for travel under autonomous driving control to a driver of the vehicle via a notification device when a proposal determination value corresponding to the length of the identified autonomously travelable section among proposal determination values set for lengths of the autonomously travelable section satisfies a first proposal criterion;
   stopping proposing travel through the autonomously travelable section under autonomous driving control to the driver when the proposal determination value corresponding to the length of the identified autonomously travelable section does not satisfy the first proposal criterion; and
   adding a predetermined addition value to the proposal determination value corresponding to the length of the identified autonomously travelable section when an action of the driver to consent to the proposal is not detected.

* * * * *